R. D. HEUREUSE.
Car Brake.
No. 78,723.
Patented June 9, 1868.
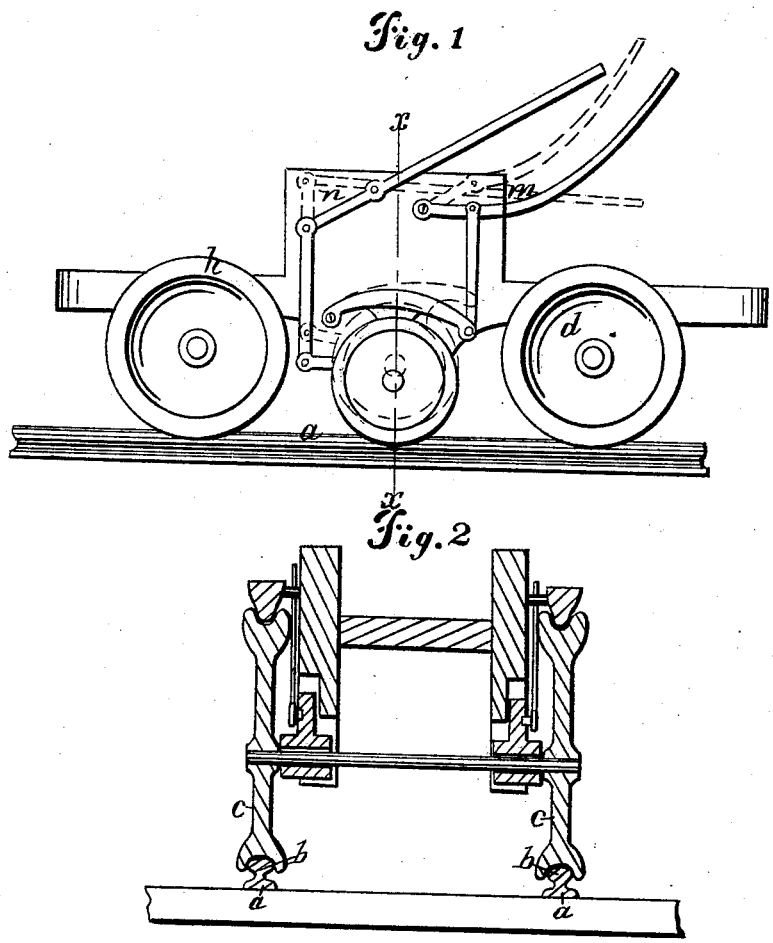

United States Patent Office.

RUDOLPH D'HEUREUSE, OF SAN FRANCISCO, CALIFORNIA.

Letters Patent No. 78,723, dated June 9, 1868.

IMPROVED TRACTION RAILWAY-BRAKES.

*The Schedule referred to in these Letters Patent and making part of the same.*

TO ALL WHOM IT MAY CONCERN:

Be it known that I, RUDOLPH D'HEUREUSE, of the city and county of San Francisco, and State of California, have invented an Improvement in Traction and Brakes for Railways; and I do hereby declare that the following is a full, clear, and exact description of the same.

The principle in the present mode of braking the running-wheels of cars is wrong; it works only imperfectly, and thereby unsafe. The wheel, stopped in its revolution by the brake, is not prevented from sliding on the rail, the consequence being that the speed of the train can be only slowly diminished, and it does, by its partly sliding, run a long distance before finally brought up. To effect a quicker and most effectual stop, not attended with sudden disastrous consequences, I propose to employ, retaining the usual running-wheels, grooved wheels raised from the track, while the train is intended to move.

But whenever braking is required, the grooved wheels are lowered to grapple over the sides of the rails, and the brake being applied at the same wheels, with nearly equal resistance to the revolution as the rails offer to the wheel against sliding, the momentum of the car or locomotive, supplied with thus-constructed brakes, will be destroyed most effectually, but without suddenness endangering the car or locomotive, however, stopping the train within a time not obtainable by the brake in operation at present on the running-wheels.

To enable others skilled in the art to make and use my invention, I shall proceed to describe the same, reference being had to the drawing annexed, in which—

Figure 1 represents a side elevation or view of a railroad-car, with improved truck applied thereto.

Figure 2, a transverse vertical section through car, representing the brake-wheel $g$ lowered, in black, and raised, in red lines, indicating also some parts of the movements for lowering and raising and applying the brake.

To employ grooved wheels for a brake on cars, the wheels that may be of different size from the running-wheels should be arranged close to and between the two trucks of a car, between the two pair of wheels, if the cars run on two pairs only, and in such a manner that while no braking is intended, they are raised sufficiently from the track not to touch the rails, (fig. 2.)

When braking is required, the brake-wheels $g$ are lowered on the rails, and the brake-blocks $h$ more or less forcibly pressed in the groove from above, according to the degree of suddenness required for braking.

It is obvious that the grooved wheels, taking hold of the rails, though turning in their progress, will be gradually but powerfully stopped by the application of the brake-blocks. The momentum of the cars is really destroyed by the action of the rails and the brake-blocks on the grooved wheels.

The lowering and raising of the grooved wheels, and the application of the brake-block may be effectively done in various modes, the description of which may be irrelevant, as I lay no claim to any particular mode to effect the same.

Having thus fully described my invention, what I claim as new, and desire to secure by Letters Patent, is—

The double-flanged or grooved wheels for brakes on railway-cars, applied and operated substantially as herein described and represented.

Signed by me, this twelfth day of April, A. D. 1867.

RUDOLPH D'HEUREUSE.

Witnesses:
   E. V. SUTTER,
   E. C. OHM.